(12) United States Patent
Xu (10) Patent No.: US 10,506,117 B2
(45) Date of Patent: Dec. 10, 2019

(54) PREFERRED LANGUAGE OF A USER INTERFACE

(71) Applicant: Hewlett-Packard Development Company, L.P., Houston, TX (US)

(72) Inventor: Rui Xu, HangZhou (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/514,053

(22) PCT Filed: Sep. 26, 2014

(86) PCT No.: PCT/CN2014/087531
§ 371 (c)(1),
(2) Date: Mar. 24, 2017

(87) PCT Pub. No.: WO2016/045081
PCT Pub. Date: Mar. 31, 2016

(65) Prior Publication Data
US 2017/0279990 A1    Sep. 28, 2017

(51) Int. Cl.
*G06F 9/451*   (2018.01)
*G06F 3/12*    (2006.01)
*H04N 1/00*    (2006.01)
*G06F 3/0484*  (2013.01)

(52) U.S. Cl.
CPC ..... *H04N 1/00498* (2013.01); *G06F 3/04847* (2013.01); *G06F 3/1207* (2013.01); *G06F 3/1236* (2013.01); *G06F 3/1259* (2013.01); *G06F 3/1286* (2013.01); *G06F 9/454* (2018.02); *H04N 1/00209* (2013.01); *H04N 1/00411* (2013.01); *H04N 2201/0094* (2013.01)

(58) Field of Classification Search
USPC ................................ 358/1.1–3.29
See application file for complete search history.

(56) References Cited

U.S. PATENT DOCUMENTS

| 6,469,713 | B2 | 10/2002 | Hetherington et al. |
| 7,013,260 | B2 | 3/2006 | Asada |
| 8,520,225 | B2 | 8/2013 | Selvaraj et al. |
| 2002/0054097 | A1* | 5/2002 | Hetherington ........ G06F 9/4448 715/762 |
| 2003/0018468 | A1 | 1/2003 | Johnson et al. |

(Continued)

FOREIGN PATENT DOCUMENTS

| CN | 103034720 A | 4/2013 |
| JP | 2006116851 A | 5/2006 |
| JP | 2007081691 A | 3/2007 |

OTHER PUBLICATIONS

"Change the Display Language of the Printer," Canon, Oce', ColorWave 600, 2011, 7 pages. <https://files.lfpp.csa.canon.com/media/Assets/PDFs/TSS/external/ColorWave600/Documentation/CW600_IS5697_OperatingInfo_US_2.pdf>.

*Primary Examiner* — Marcellus J Augustin
(74) *Attorney, Agent, or Firm* — HP Inc. Patent Department (57) ABSTRACT

Examples disclosed herein relate to a preferred language of a user interface. Examples disclosed herein include a job request including a language parameter associated with a preferred language different from a default language of a user interface of a service device, and displaying at least a portion of the user interface in the preferred language.

15 Claims, 7 Drawing Sheets

(56) References Cited

U.S. PATENT DOCUMENTS

| | | | |
|---|---|---|---|
| 2004/0156071 A1 | 8/2004 | Lay et al. | |
| 2005/0264830 A1* | 12/2005 | Une | G03G 15/5016 358/1.1 |
| 2006/0050323 A1* | 3/2006 | Wada | G06Q 20/20 358/302 |
| 2008/0097746 A1* | 4/2008 | Tagata | G06F 17/275 704/8 |
| 2010/0084200 A1* | 4/2010 | Juan-Castellanos | G01G 19/40 177/25.15 |
| 2010/0281389 A1* | 11/2010 | Hutchinson | G06Q 30/02 715/736 |
| 2011/0244441 A1* | 10/2011 | Okabayashi | H04N 1/00408 434/365 |
| 2014/0215330 A1* | 7/2014 | Lee | G09B 29/007 715/703 |

* cited by examiner

PREFERRED LANGUAGE OF A USER INTERFACE

BACKGROUND

Many service devices such as printers, scanners, copiers, all-in-one devices, etc., come equipped with a display. The display may show a user interface allowing the user to determine the status of the device, the progress of the job being performed, and the like. The user may also provide input to the service device, for example, using a touch-sensitive display or buttons associated with the display.

BRIEF DESCRIPTION OF THE DRAWINGS

The following detailed description references the drawings, wherein.

DETAILED DESCRIPTION

In some examples, a service device may present a user interface in a number of languages. By default, the service device may present a user interface in a default language which may be preselected by the manufacturer or the user. Some service devices, such as printers, scanners, copiers, fax machines, all-in-one devices, public information kiosk, etc., may be installed in offices or other places where the devices are used by multiple users. For such devices, the default language may be preselected, for example, to match the most common language used at the place where the device is installed. Some users (e.g., visitors) may not know the default language, and therefore may have trouble understanding the user interface displayed on the device's display. These users may therefore be unable to understand and fix any warnings or errors associated with the job being performed, to make any necessary selections associated with the job, and so forth.

Some service devices may allow the user to change the language using the user interface. However, this would still require the user to have some understanding of the default language in order to navigate the menus of the user interface and find the right language selection. Some service devices may simplify this task, for example, by providing a button on the main screen of the user interface, where selecting the button will immediately change the default language to another language. However, this may still not help those users who speak neither of the two languages. Accordingly, it may be desirable to have a system that may (e.g., temporarily) change the language of the user interface to a language that a particular user currently using the device understands.

Examples disclosed herein relate, among other things, to a service device coupled to a display. The service device may include, for example a display language selector to receive a job request from a computing device, the job request including a language parameter corresponding to a preferred language associated with the computing device. The display language selector may also be configured to execute a job associated with the job request, while the job is executing, display on the display a user interface in at least the preferred language, and automatically change the user interface's language to a default language associated with the service device after at least one of a successful completion of the job, a cancellation of the job by a user, and a receipt of a language modification input from the user.

Figure 1:
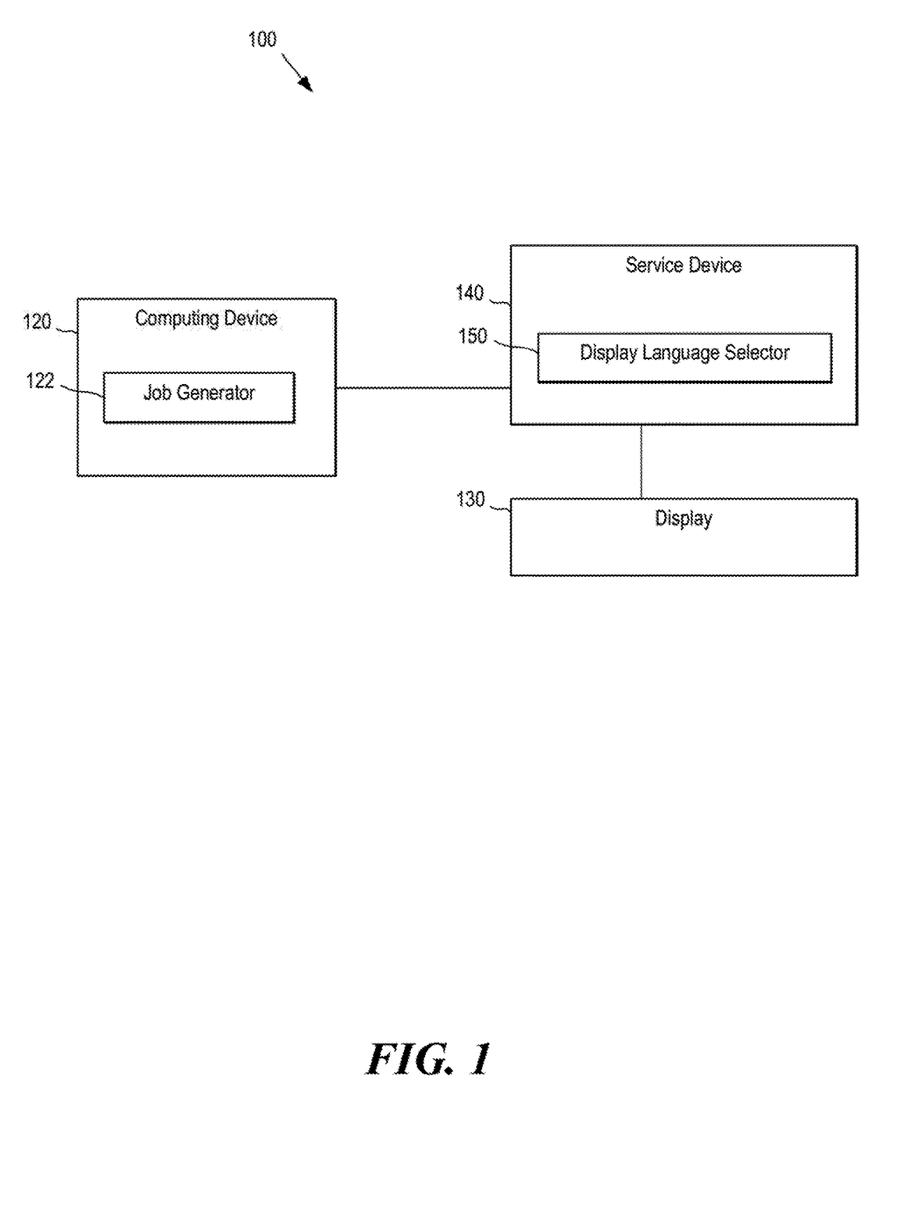
FIG. 1 is a block diagram of an example computing system.

FIG. 1 is a block diagram of an example computing system 100. Computing system 100 may include, among other things, a computing device 120 and a service device 140 communicatively coupled to display 130.

Computing device 120 may be any type of computing device that is capable of generating service requests and communicating with service device 140 (e.g., over at least one network and/or cable or wireless connection) to send the service requests or other data, and in some examples to receive responses such as device status, job status, and the like. In examples described herein, a computing device may be, for example, a mobile phone (e.g., smartphone), tablet, laptop, desktop, workstation, server, smart television, wearable computing device (e.g., smart watch or other smart computing apparel), retail point of sale device, display, camera, gaming device, application-specific computing device or any other type of processing device or equipment including a processor. In some examples, computing device 120 may include two or more communicatively coupled computing devices.

Service device 140 may be any electronic or computing device coupled to a display and capable of communicating with computing device 120 (e.g., over at least one network and/or cable or wireless connection), to receive job requests from computing device 120, to process the requests, and in some examples to send back to computing device 120 various data such as device status, job status, and the like. In examples described herein, a service device may be, for example, a printing device (e.g., a personal printer, a networked or shared printer, a commercial or industrial printer, a 3D printer, etc.), a scanner, a copier, a fax, a multifunction printer (MFP), an all-in-one device, a projector, a display, a camera, and the like. In some examples, service device 140 may include a display language selector 150, further described in detail below.

Display 130 may be any type of display, screen, or monitor that may be coupled (e.g., communicatively, electronically, etc.) to service device 140 such as a liquid crystal display (LCD), light emitting diode (LED) display, organic light-emitting diode (OLED), and the like. In some examples, display 130 may be a touch-sensitive display or a touch screen. Display 130 may be a part of service device 140 or it may be, a separate device (e.g., a virtual or remote display) communicatively coupled to service device 120, e.g., via a wired or wireless connection, through network, etc. Display 130 may receive display data such as user interface from service device 140 and visually render that data.

Computing device 120 may include a job generator 122. Job generator 122 may be implemented in the form of instructions (e.g., stored on a machine-readable storage medium) that, when executed (e.g., by a processor of computing device 120), may implement the functionality of job generator 122. In some examples, the instructions may be part of an operating system (OS), or part of one or more software drivers and/or applications, such as a driver or application associated with service device 140 and installed on computing device 120 to communicate with and control service device 140. Alternatively or in addition, job generator 122 may include electronic circuitry (i.e., hardware) that implements the functionality described below.

Job generator 122 may determine generate one or more job requests. A job request may be generated, for example, based on an input from a user, or automatically (e.g., as a periodic event). For example, job generator 122 may generate the job request based on user's input requesting to print a document. Job generator 122 may include in the job request any information describing the job to be performed. For example, if the job is a printing job, the job request may include the contents of the document to be printed, and various parameters describing how the document is to be printed.

In some examples, generator 122 may include in the job request at least one language parameter associated with a preferred language. In some examples, the preferred language may be associated with computing device 120, e.g., with software (e.g., operating system, applications, etc.) running on computing device 120. For example, the preferred language may be the system language set for the operating system of computing device 120. The system language may be, for example, the language currently being used by the operating system to present its user interface to the user. Generator 122 may automatically detect and obtain the system language, for example, by accessing the system variables of the operating system.

In some examples, the preferred language may be the language used by the application from which the user initiated the job request, or it may be the language associated with the contents of the job, such as the language of the document being printed. In some examples, the preferred language may be manually selected by the user when the user initiates the job request. In some examples, the preferred language may be determined as the preferred language selected by the same user for the previous job request. In some examples, the preferred language may be determined based on the geographic location of computing device 120, which may be determined, e.g., based on its set time zone, IP address, GPS coordinates, etc.

After determining the preferred language, generator 122 may determine a language parameter associated with the preferred language, such as a language code, which may be a number or a string of characters uniquely identifying the preferred language. Generator 122 may then include the language parameter in the job request. In some examples, the job request and any other communications between computing device 120 and service device 140 may comply with a standard communication protocol. In such a case, generator 122 may include the language parameter in one or more custom fields or fields designated by the protocol as fields describing a preferred language.

In some examples, the standard protocol used for communication may be the Internet Printing Protocol (IPP) described in RFC 3196, in which case the job request may be any type of operation request supported by IPP, such as Create-Job Request, Print-Job Request, Print-URI request, Send-Document Request, Send-URI Request, etc. In these examples, generator 122 may include the language parameter (e.g., language code) in at least one of the following attributes of the operation request: "attributes-charset," "attributes-natural-language," and "document-natural-language." It is appreciated, however, that the examples disclosed herein are not limited to IPP, and may be implemented using any suitable protocol, such as HP ePrint, PictBridge, and the like.

After generating the job request and including the language parameter in the job request, generator 122 may send the job request to service device 140. For example, generator 122 may send the job request to service device 140 through wired or wireless signals, through one or more networks such as local area networks (LANs), wide area networks (WANs), the Internet, etc. As mentioned above, the job request may be sent over an established protocol such as IPP, in which case job generator 122 may have additional communications with service device 140, which may include discovering service device 140 (e.g., among a number of service devices), exchanging information (e.g., performing handshake), etc.

While some examples disclosed herein describe, for reasons of brevity, the language parameter as being included in and transmitted with the job request, it should be appreciated that in those or other examples, the language parameter may not be included in the job request, and may be transmitted in a separate communication to service device 140. The separate communication including the language parameter may be sent by generator 122 to service device 140, for example, before, after, or in parallel to the job request.

As will be discussed below, sending the job request and the language parameter (e.g., included in the job request) to service device 140 may cause service device 140 to change (e.g., temporarily) the language of its user interface to the preferred language. After sending the job request and the language parameter, generator 122 may receive return communications from service device 140, such as a confirmation of receiving the job request, one or more job status updates, and tare like.

Figure 2:
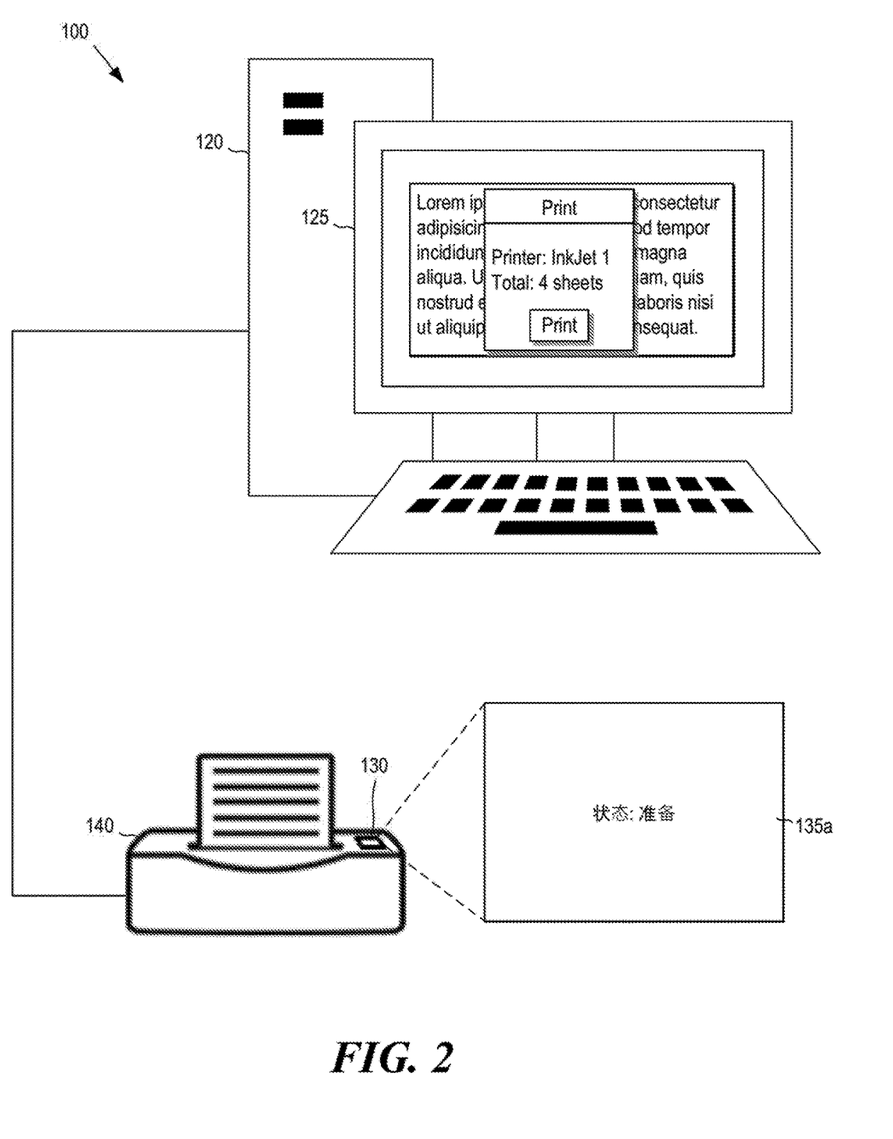
FIG. 2 is another example of the computing system of FIG. 1.

FIG. 2 illustrates another example of computing system 100 including computing device 120 coupled to a display 125, where the computing device 120 is connected to service device 140 (in this example, a printer) that is coupled to display 130. As described in FIG. 2, before the user of computing device initiates a job request (e.g., a printing job), service device 140 may display, on display 130, user interface 135a in a default language, where the default language may be preset on service device 140 by a manufacturer, a user, or by any other means. In this example, the default language is set to Simplified Chinese, and user interface 135a includes a text in Simplified Chinese, the text corresponding to "Status: Ready."

As discussed above, the job request may be generated by generator 122 based on an input received from a user (e.g., clicking on the "Print" button), or based on other events, such as a scheduled event, receipt of another request from another device, and so forth. Generator 122 then generates and sends the job request to service device 140 as described above.

Service device 140 may receive the job request from computing device 120 and process the job request by display language selector 150. Display language selector 150 may generally represent any combination of hardware and programming. Engine 150 may be implemented in the form of instructions (e.g., stored on a machine-readable storage medium) that, when executed (e.g., by a processor of service device 140), may implement the functionality of engine 150. In some examples, the instructions may be part of an operating system (OS), or part of one or more software drivers and/or applications installed on service device 140 to communicate with computing device 120. Alternatively or in addition, engine 150 may include electronic circuitry (i.e., hardware) that implements the functionality described below.

After receiving the job request, display language selector 150 may determine whether the job request contains any (e.g., one or more) language parameters indicating a preferred language, and if so, extract such parameter(s). For example, if the job request is received over the IPP protocol, engine 150 may extract from the job request one or more of the following parameters: "attributes-charset," "attributes-natural-language," and "document-natural-language." As described above, a language parameter may include, for example, a language code (e.g., "en-us," "en-gb," "zh-cn," etc.) uniquely identifying the preferred language of computing device 120, where the preferred language may be determined by computing device 120 as the system language of computing device 120, or based on other criteria discussed above. In some examples, if engine 150 identifies two or more language parameters, and all parameters include the same language code, engine 150 may choose the language corresponding to that language code as the preferred language. If, however, some parameters include different language code, engine 150 may choose the preferred language based on one of the parameters, and either disregard the other parameters, or use the other parameters to determine a secondary preferred language, as further discussed below.

After determining the preferred language, display language selector 150 may change the language of the user interface and display the user interface (or at least a portion thereof) in the preferred language. In some examples, engine 150 may display the entire user interface or substantially the entire user interface (e.g., more than 90%) in the preferred language. In other examples, engine 150 may display a first portion of the user interface in the preferred language, and a second portion of the user interface in the default language. In yet other examples, engine 150 may alternate the language of the user interface. For example, engine 150 may display the user interface in the default language for a predefined period of time (e.g., 3 seconds), then display the user interface in the preferred language for the same or different period of time, then in the default language again, and so on.

In some examples, in order to display the user interface in the preferred language, engine 150 may obtain localization data associated with the preferred language. The localization data may include, for example, fonts corresponding to the preferred language, words or phrases in the preferred language that may appear in the user interface, and so forth. In some examples, localization data may be stored on service device 140 or in a remote device (e.g., server) accessible by service device 140. In some examples, service device 140 may receive the localization data from computing device 120. For example, before, after, or together with sending the job request and the language parameter, computing device 120 may also send to service device 140 localization data associated with the preferred language included in the language parameter.

In some examples, engine 150 may only display the user interface in the preferred language temporarily, for example, for the duration of the job execution. For example, engine 150 may only change the language to the preferred language until a predefined period of time (e.g., 30 seconds) after the requested job is finished. That is, in some examples, immediately or after some (predefined) period of time after the job is finished, engine 150 may switch the language of the user interface back to the default language. Switching the language back to the default language may include stopping displaying the user interface (or portions thereof) in the preferred language, stopping alternating between the default and the preferred languages, and otherwise returning to the initial state of the user interface.

In some examples, the job may be considered finished when, for example, the job is fully and successfully executed by service device 140 (e.g., last page is printed, scanned, copied, faxed, etc.,) and (in some examples) when the user has acknowledged the job completion. In some examples, the job may also be considered finished if the user cancels the job before its successful completion. In some examples, the job may also be considered finished after a predefined amount (e.g., 10 minutes) of time during which service device 140 was idle.

Figure 3:
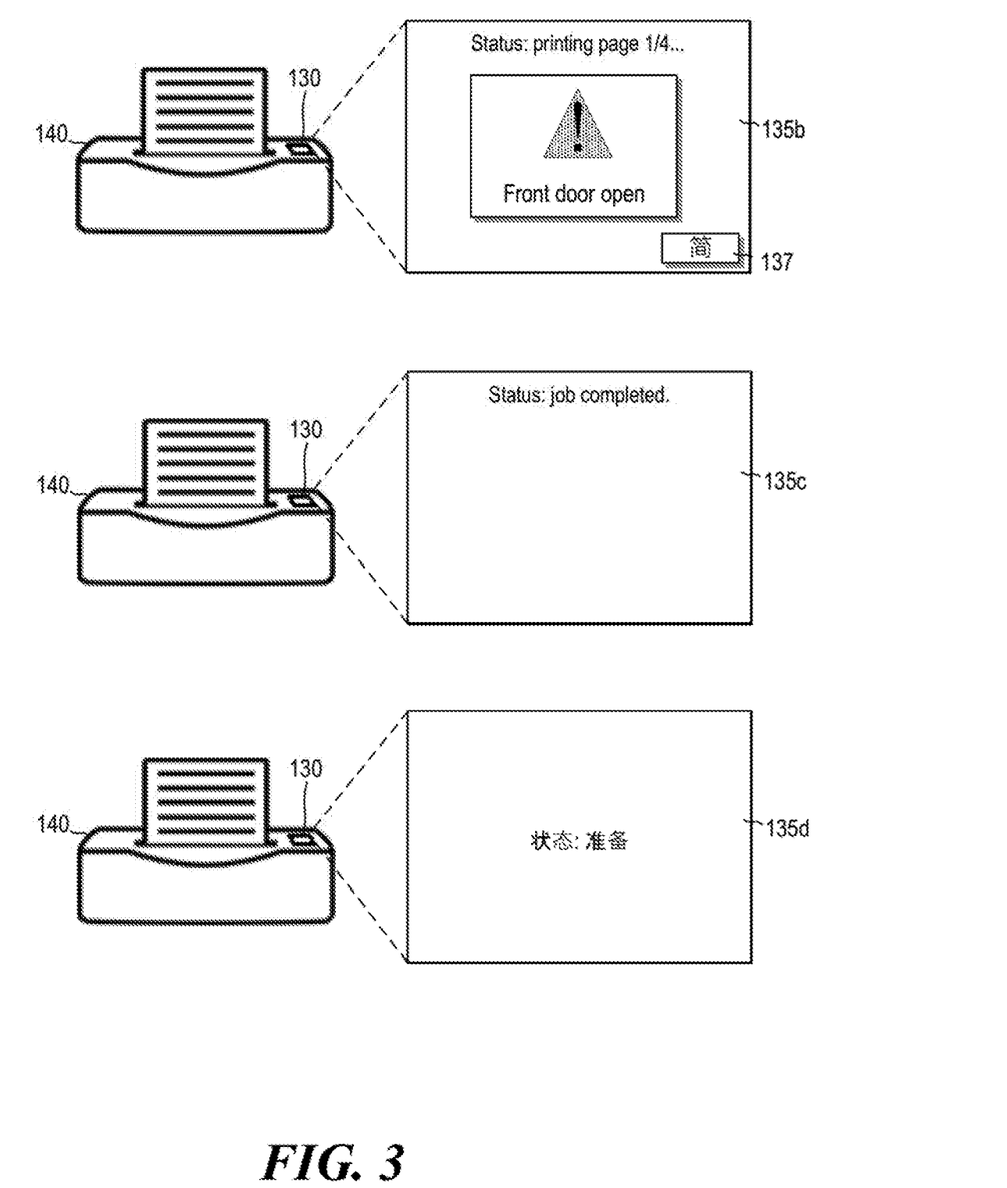
FIG. 3 illustrates example user interfaces of a service device.

In the example illustrated in FIGS. 2 and 3, after displaying user interface 135a in the default language (Simplified Chinese), service device 140 receives a job request from computing device 120, determines the preferred language (in this example, English-US) based on the job request as described above, begins executing the job in accordance with the job request, and displays user interface 135 in English (US). In some examples, engine 150 may change the language of the user interface to the preferred language immediately after receiving the job request and determining the preferred language, which may occur before, after, or at the same me as beginning executing the job. In the example illustrated in FIG. 3, after receiving the job request, engine 150 determines that the front door of service device 140 is open and issues a corresponding message, as indicated in user interface 135b. The user may then fix the problem, after which the job execution (in this example, the printing of four pages) may continue and successfully finish, as indicated in user interface 135c. Immediately, or some predefined time after the job is finished, service device 140 (e.g., engine 150) may switch back to the default language and display user interface 135d (which may be same or similar to 135a) in Simplified Chinese.

In some examples, when engine 150 displays the user interface on display 130 in the preferred (and not in the default) language, engine 150 may include in the user interface a language modification component, such as button 137, where the component includes an indication of the default language, the indication appearing in the default language. Engine 150 may then receive a user input associated with the component (e.g., user's selection of button 137), and based on the input, switch the user interface back to the default language (even before the job is finished).

In some examples, service device 140 may also use the preferred language (e.g., as opposed to the default language) to change the language of its communications with computing device 120. For example, for any strings of characters service device 140 sends to computing device (e.g., during the initialization or handshaking phase or during any subsequent communications), service device 140 may use strings of characters corresponding to the preferred language. For example, when service device 140 sends identification information (e.g., device name, type, model, etc.), it may send that information in the preferred language. This may allow the user of computing device 120, among other things, to easily identify service device 140 (e.g., during the discovery stage where the user is selecting one of several service devices).

In some examples, the user may connect a storage device (e.g., a USB thumb driver or an SD card) to service device 140 to run view, scan, print, or perform other operations from the storage device. In such examples, engine 150 may scan the file system on the storage device, and based on information like the file name, the directory name, etc., of the file to be printed, determine the preferred language of the user. If the determined preferred language is different from the default language, engine 150 may will prompt user (e.g., in the preferred language) to inquire whether the user would like to change the language of the user interface to the preferred language temporary. If the user responds positively to such query, engine 150 may temporarily change the language of the user interface to the preferred language, for example, as described in other examples disclosed herein.

In some examples, the user of computing device 120 may control whether or not to use the preferred language associated with device 120 for the user interface of display 130. In some examples, computing device 120 (e.g., job generator 122) may determine the default language set on service device 140, e.g., during the discovery, handshaking, or initialization communication phases between the two devices. Thus, in some examples, before sending the job request to service device 140, generator 122 may receive from service device 140 a communication (e.g., a response to an inquiry) containing, among other things, at least one language parameter identifying the default language currently set on service device 140. For example, if the devices communicate over IPP, the communication may be a Get-Printer-Attributes Response having an "attributes-charset" parameter and/or an "attributes-natural-language" parameter. The Get-Printer-Attributes Response may be sent by service device 140 in response to a Get-Printer-Attributes Request sent to service device 140 by computing device 120 (e.g., generator 122). Based on the language parameter, generator 122 may determine the default language of the user interface displayed on display 130 coupled to service device 140. Similarly to the methods discussed above, generator 122 may determine the default language, for example, based on the language code included in the language parameter, where the language code may uniquely identify the default language.

After identifying the default language, generator 122 may compare the default language to the preferred language and determine whether the default language is different than the preferred language. If (and in some examples, only if) the languages are different, generator 122 may provide the user with a language selection query. In some examples, the language selection query may be included in the job initiation window shown to the user when the user initiates a job request. In other examples, the language selection query may be shown to the user before the user initiates a job, for example, when the service device 170 is first discovered by computing device 120. In some examples, the language selection query may be shown to the user when the user sets up a device driver and/or software for service device 140. In some examples, if the user selects a prefer language during such initialization process, generator 122 may use the preferred language at any future time without presenting the language selection query to the user.

Figure 4:
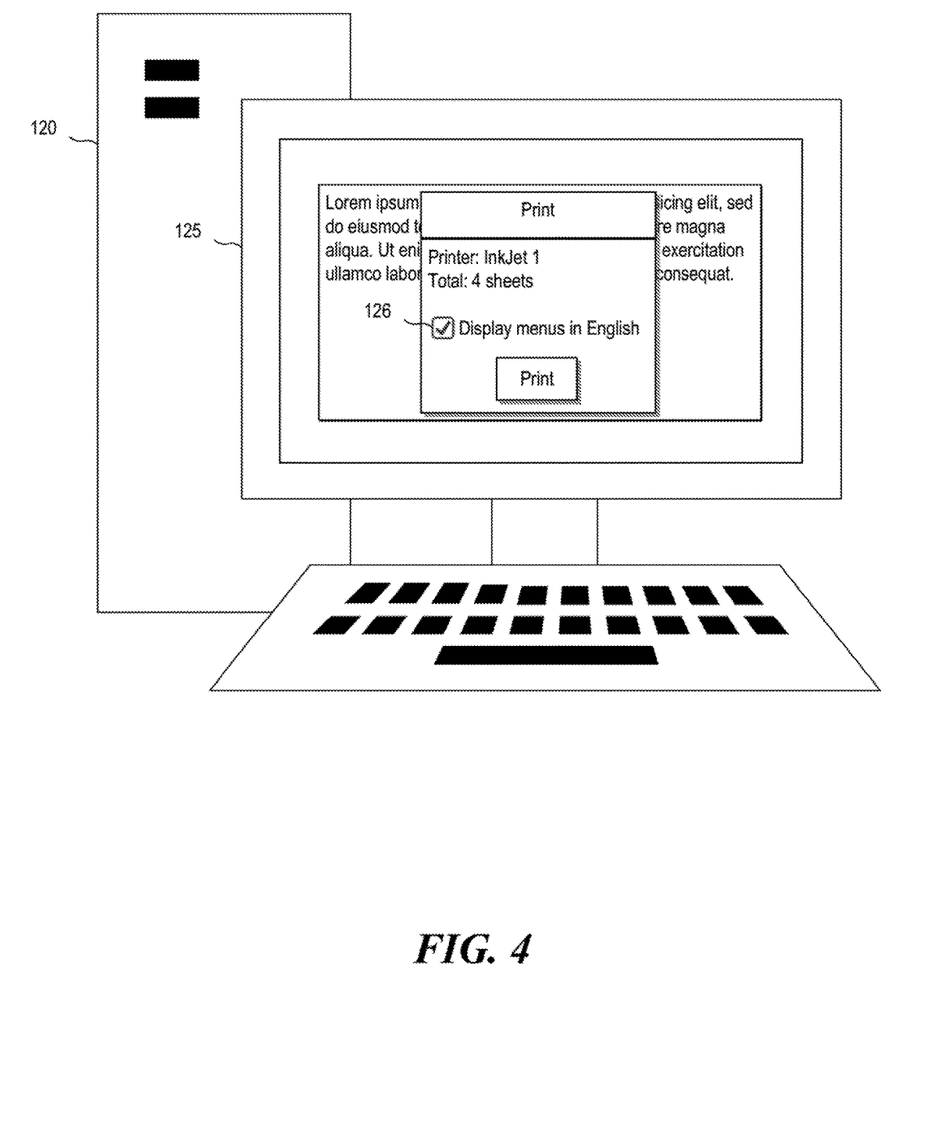
FIG. 4 illustrates an example computing device.

In the example illustrated in FIG. 4, generator 122 displays on display 125 a language selection query 126 (in this example, a checkbox) asking the user whether or not the user prefers to use the preferred language of computing device 120 (in this example, English) or not. Based on the user's response to the query (e.g., based on whether the checkbox is selected) generator 122 may decide whether to include in the job request a language parameter corresponding to the preferred language or a language parameter corresponding to the default language. In some examples, if the user selects the default language, generator 122 may not include in the job request any language parameters.

Figure 5:
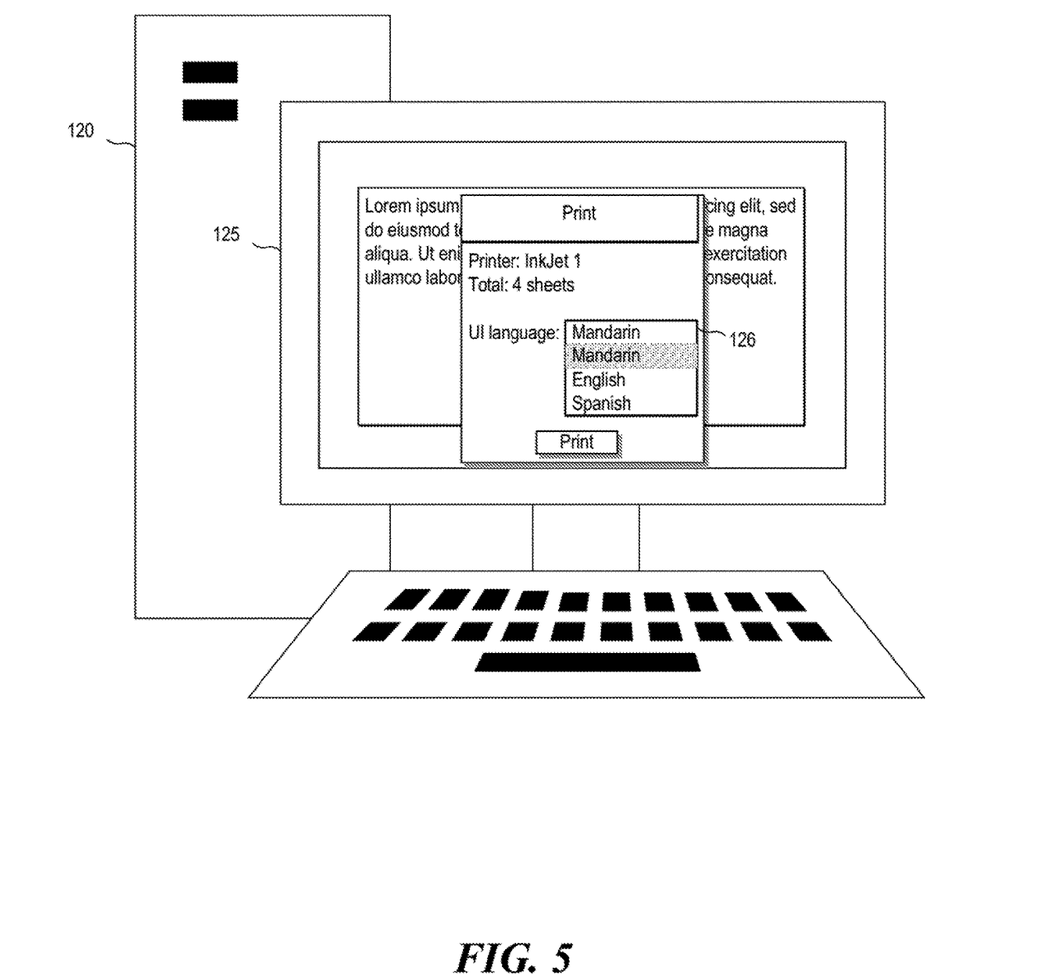
FIG. 5 illustrates another example of a computing device.

In some examples, query 126 may also include (e.g., indicate) the default language of service device 140. In some examples, as illustrated in FIG. 5, instead or in addition to the preferred and default languages, query 126 may also include one or more languages other than the preferred and default languages, and the user may be able to select any of those other languages. In such examples, generator 122 may include in the job request (or transmit in a separate communication to service device 140) a language parameter corresponding to the selected language instead of the preferred language.

In foregoing discussion, job generator 122 and report job processing engine 150 were described as any combinations of hardware and programming. Such components may be implemented in a number of fashions. The programming may be processor executable instructions stored on a tangible, non-transitory computer readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer readable medium can be said to store program instructions that when executed by the processor resource implement the functionality of the respective component. The computer readable medium may be integrated in the same device as the processor resource or it may be separate but accessible to that device and the processor resource. In one example, the program instructions can be part of an installation package that when installed can be executed by the processor resource to implement the corresponding component. In this case, the computer readable medium may be a portable medium such as a CD, DVD, or flash drive or a memory maintained by a server from which the installation package can be downloaded and installed. In another example, the program instructions may be part of an application or applications already installed, and the computer readable medium may include integrated memory such as a hard drive, solid state drive, or the like.

Figure 6:
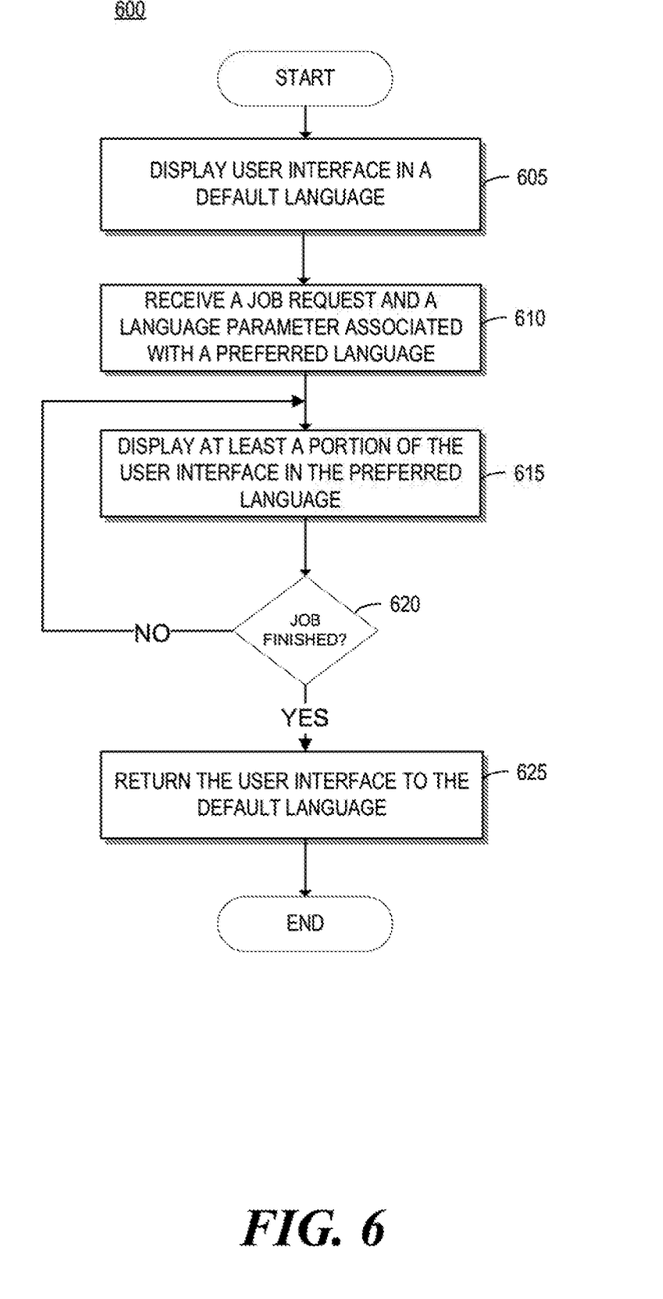
FIG. 6 is a flowchart illustrating an example method for displaying a user interface in a preferred language.

FIG. 6 is a flowchart of an example method 600 for displaying a user interface in a preferred language. Method 600 may be described below as being executed or performed by a system, for example, by computing system 100 or by service device 140 of FIG. 1. Other suitable systems and/or computing devices may be used as well. Method 600 may be implemented in the form of executable instructions stored on at least one non-transitory machine-readable storage medium of the system and executed by at least one processor of the system. Alternatively or in addition, method 600 may be implemented in the form of electronic circuitry (e.g., hardware). In alternate examples of the present disclosure, one or more or blocks of method 600 may be executed substantially concurrently or in a different order than shown in FIG. 6. In alternate examples of the present disclosure, method 600 may include more or less blocks than are shown in FIG. 6. In some examples, one or more of the blocks of method 600 may, at certain times, be ongoing and/or may repeat.

At block 605, method 600 may display, on a display of a service device, a user interface in a default language of the service device. At block 610, the method may receive from a computing device a job request and a language parameter associated with a preferred language (which may be different from the default language). As described above, in some examples, the language parameter may be included in the job request, while in other examples it may be transmitted in a separate communication. If the language parameter is included in the job request, the method may extract the language from the job request and determine the preferred language based on the extracted language parameter (e.g., based on a unique language code included in the parameter).

After receiving the job request and the language parameter, at block 615 may display at least a portion of the user interface (or substantially the entire user interface) in the preferred language on the display of the service device. At block 620, the method may determine whether or not the job associated with the job request is finished, and proceed to block 625 only after the job is finished. At block 625, the method may return the user interface to the default language. As described above, the method may display the user interface on the display in the default language after the job is successfully completed, after the user cancel the job, or after the user acknowledges the job completion (e.g., by pressing "Ok"). In some examples, as described above, the method may display the user interface after a predefined period of time passes after any of the aforementioned event occurs. Additionally, in some examples, when the method displays the user interface in the preferred language, the user interface may include a language modification component, in which case the method may receive a user input corresponding to the language modification component, and, based on the input, return the user interface to the default language before the job is finished.

Figure 7:
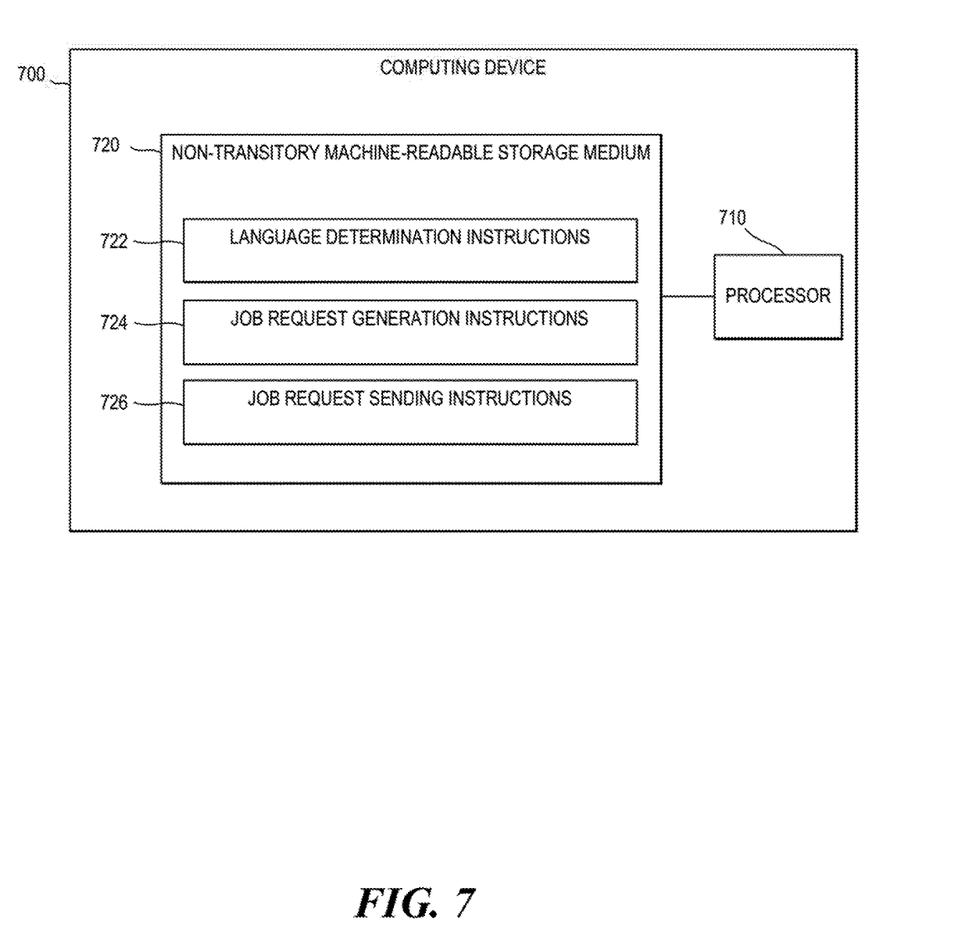
FIG. 7 is a block diagram of another example of a computing device.

FIG. 7 is a block diagram of an example computing device 700. In some examples, computing device 700 may be similar to computing device 120 of FIG. 1. In the example of FIG. 7, computing device 700 includes a processor 710 and a non-transitory machine-readable storage medium 720. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 710 may be one or more central processing units (CPUs), microprocessors, and/or other hardware devices suitable for retrieval and execution of instructions stored in non-transitory machine-readable storage medium 720. In the particular example shown in FIG. 7, processor 710 may fetch, decode, and execute instructions 722, 724, 726, or any other instructions (not shown for brevity). As an alternative or in addition to retrieving and executing instructions, processor 710 may include one or more electronic circuits comprising a number of electronic components for performing the functionality of one or more of the instructions in machine-readable storage medium 720. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Non-transitory machine-readable storage medium 720 may be any electronic, magnetic, optical, or other physical storage device that stores executable instructions. Thus, medium 720 may be, for example, Random Access Memory (RAM), an Electrically-Erasable Programmable Read-Only Memory (EEPROM), a storage drive, an optical disc, and the like. Medium 720 may be disposed within computing device 700, as shown in FIG. 7. In this situation, the executable instructions may be "installed" on computing device 700. Alternatively, medium 720 may be a portable, external or remote storage medium, for example, that allows computing device 700 to download the instructions from the portable/external/remote storage medium in this situation, the executable instructions may be part of an "installation package". As described herein, medium 720 may be encoded with executable instructions for detecting finger movements and performing display actions.

Instructions 722, when executed by a processor (e.g., 710), may cause a computing device (e.g., 700) to determine a default language of a service device and a preferred language of computing device. Instructions 722 may determine the default language associated with the service device, for example, based on a communication with the service device, as described above. As also described above, determining the preferred language of the computing device may include identifying at least one of the following: i) a system language of an operating system of the computing device, ii) an application language of an application running on the computing device, iii) a language of at least one document associated with the job request, and iv) a geographic location of the computing device. Instructions 722 may then compare the default language to the preferred language, and if the languages are different, provide a language selection query to a user of the computing device, and obtain from a user a selected language in response to the query, as discussed above. The language selection query may include the default language, the preferred language, and any additional languages.

Instructions 724 may then generate a job request comprising a language parameter associated with the selected language. As described above, in some examples, instead of including the language parameter in the job request, the language parameter may be transmitted in a separate communication to the service device.

Instructions 726 may then send the job request to the service device (e.g., 140) causing the service device to change the user interface displayed on a displayed coupled thereto from a default language associated with the service device to the selected language. As described above, sending the job request may also cause the service device to execute a job associated with the job request and to change the user interface back to the default language after the job is finished.

The invention claimed is:

1. A method comprising:
   displaying, on a display of a print service device, a user interface in a default language of the print service device;
   receiving, at the print service device, a print job request from a user computing device, wherein the print job request includes content of a document to be printed and a language parameter associated with a preferred language different from the default language;
   determining, by a processor of the print service device, the preferred language in the print job request by identifying a string of characters in the print job request that represents a language code of the preferred language;
   after determining the preferred language in the print job request, displaying, by the processor, a first portion of the user interface of the print service device in the preferred language and a second portion of the user interface of the print service device in the default language; and
   after a print job corresponding to the print job request is finished for a predefined period of time, returning, by the processor, the first portion of the user interface of the print service device to the default language.

2. The method of claim 1, wherein the first portion of the user interface in the preferred language comprises substantially the entire user interface in the preferred language compared to the second portion of the user interface in the default language.

3. The method of claim 1, wherein the user interface is returned to the default language after at least one of: a user cancels the job, and the user acknowledges the job completion.

4. The method of claim 1, wherein the print service device comprises a printer, and the print job request is received by the print service device from the computing device over Internet Printing Protocol (IPP).

5. The method of claim 1, wherein displaying the second portion of the user interface in the default language comprises displaying in the user interface a language modification component in the default language, the method further comprising:
receiving a user input at the language modification component, and
in response to the user input, returning the preferred language displayed in the user interface to the default language before the print job is finished.

6. A print service device coupled to a display, the print service device comprising:
a processor; and
a memory storing instructions that are executable to cause the processor to:
receive a print job request from a user computing device, the print job request comprising content to be printed and a language parameter corresponding to a preferred language associated with the user computing device;
determine the preferred language in the print job request by identifying a string of characters in the print job request that represents a language code of the preferred language;
execute a print job associated with the print job request;
while the print job is executed, display on the display a first portion of a user interface in the preferred language and a second portion of the user interface in a default language of the print service device; and
change the preferred language displayed in the user interface to the default language after the print job is finished for a predefined period of time.

7. The print service device of claim 6, wherein the instructions executable to cause the processor to periodically alternate the user interface's language in the first portion between the preferred language and the default language.

8. The print service device of claim 6, wherein the preferred language is at least one of: a system language of an operating system of the user computing device, an application language associated with the print job request, and a document associated with the print job request.

9. The print service device of claim 6, wherein the instructions are executable to cause the processor to obtain localization data associated with the preferred language from the user computing device.

10. The print service device of claim 6, wherein the print job request is received from the user computing device over a network using Internet Printing Protocol (IPP).

11. A non-transitory machine-readable storage medium storing instructions executable by a processor of a print service device to cause the service non-transitory machine-readable storage medium device to:
receive a print job request from a user computing device, the print job request comprising content to be printed and a language parameter corresponding to a preferred language associated with the user computing device;
determine the preferred language in the print job request by identifying a string of characters in the print job request that represents a language code of the preferred language;
execute a print job associated with the print job request;
while the print job is executed, display on the display a first portion of a user interface in the preferred language and a second portion of the user interface in a default language of the print service device; and
change the preferred language in the first portion of the user interface to the default language after the print job is finished for a predefined period of time.

12. The non-transitory machine-readable storage medium of claim 11, wherein the instructions are executable to cause the print service device to periodically alternate the first portion of the user interface between the preferred language and the default language.

13. The non-transitory machine-readable storage medium of claim 11, wherein the preferred language is at least one of: a system language of an operating system of the user computing device, an application language associated with the print job request, and a document associated with the print job request.

14. The non-transitory machine-readable storage medium of claim 11, wherein the instructions are executable to cause the print service device to obtain localization data associated with the preferred language from the user computing device.

15. The non-transitory machine-readable storage medium of claim 11, wherein the print job request is received from the user computing device over a network using Internet Printing Protocol (IPP).

* * * * *